United States Patent [19]
Natsudaira

[11] Patent Number: 5,740,514
[45] Date of Patent: Apr. 14, 1998

[54] INFORMATION CARRYING SHEET AND ILLEGAL COPYING PREVENTIVE IMAGE PATTERN

[75] Inventor: Nagahisa Natsudaira, Tokyo, Japan

[73] Assignee: Toppan Printing Co., Ltd., Tokyo, Japan

[21] Appl. No.: 518,686

[22] Filed: Aug. 24, 1995

Related U.S. Application Data

[62] Division of Ser. No. 154,505, Nov. 19, 1993, Pat. No. 5,475,468.

[30] Foreign Application Priority Data

Nov. 20, 1992 [JP] Japan .................... 4-312277

[51] Int. Cl.$^6$ ............................. G03G 21/00; G03G 21/04
[52] U.S. Cl. ..................... 399/366; 283/902; 283/88; 380/51
[58] Field of Search ................... 355/201, 133; 283/902, 88; 380/51; 399/366

[56] References Cited

U.S. PATENT DOCUMENTS

| | | | |
|---|---|---|---|
| 3,852,088 | 12/1974 | Godlewski et al. | 355/133 X |
| 3,977,785 | 8/1976 | Harris | 355/133 |
| 4,586,811 | 5/1986 | Kubo et al. | 355/133 X |
| 4,603,970 | 8/1986 | Aota et al. | 355/133 |
| 4,627,819 | 12/1986 | Burrows | 283/88 X |
| 4,678,322 | 7/1987 | Finkel et al. | 355/133 |
| 4,869,532 | 9/1989 | Abe et al. | 283/88 |

FOREIGN PATENT DOCUMENTS

| | | |
|---|---|---|
| B-2304584 | 4/1987 | Australia . |
| A-0 263 446 | 4/1988 | European Pat. Off. . |
| A-0 358 610 | 3/1990 | European Pat. Off. . |
| A-0 382 549 | 8/1990 | European Pat. Off. . |
| A-0 432 093 | 6/1991 | European Pat. Off. . |
| A-0 467 067 | 1/1992 | European Pat. Off. . |
| A-0 493 961 | 7/1992 | European Pat. Off. . |
| A-59-026 288 | 2/1984 | Japan . |
| A-63-144 075 | 6/1988 | Japan . |
| A-64 030 788 | 2/1989 | Japan . |
| A-64 061 777 | 3/1989 | Japan . |
| A-1-188 386 | 7/1989 | Japan . |
| A-3-227 378 | 10/1991 | Japan . |
| A-2 229 189 | 9/1990 | United Kingdom . |

OTHER PUBLICATIONS

Research Disclosure, No. 160, Aug. 1977, Havant GB, p. 60.
IBM Technical Disclosure Bulletin, vol. 32, No. 7, Dec. 1989, pp. 305–307.

*Primary Examiner*—Fred L. Braun
*Attorney, Agent, or Firm*—Armstrong, Westerman, Hattori, McLeland & Naughton

[57] ABSTRACT

An information carrying sheet of securities, identification cards and the like which is provided with an illegal copying preventive image pattern in which the existence of an illegal copying preventive image pattern is hardly discriminated by the naked eye. An illegal copying preventive image pattern which prevents an unnecessary exposure by combining a plurality of patterns having an absorption in different regions used in the sheet and incorporating a dummy pattern, and which is difficult to perform falsifying/altering/counterfeiting action; and an ink composition which is used for the image pattern, and has a high IR absorption. Whether copying is acceptable or not can be promptly judged with a less memory capacity to shorten copying processing time, and falsifying/altering/counterfeiting action can be securely prevented in such a manner that the application of an illegal copying preventive processing is not noticed easily by a third party.

20 Claims, 10 Drawing Sheets

FIG.2

| ILLEGAL COPYING PREVENTIVE MARK | S | T | U | V | W |
|---|---|---|---|---|---|

$\underbrace{\phantom{xxxxxxxxxxxxxxxxxxxxxxxxxxxxxxxxxxxxxxxxxxxxxx}}_{2}$

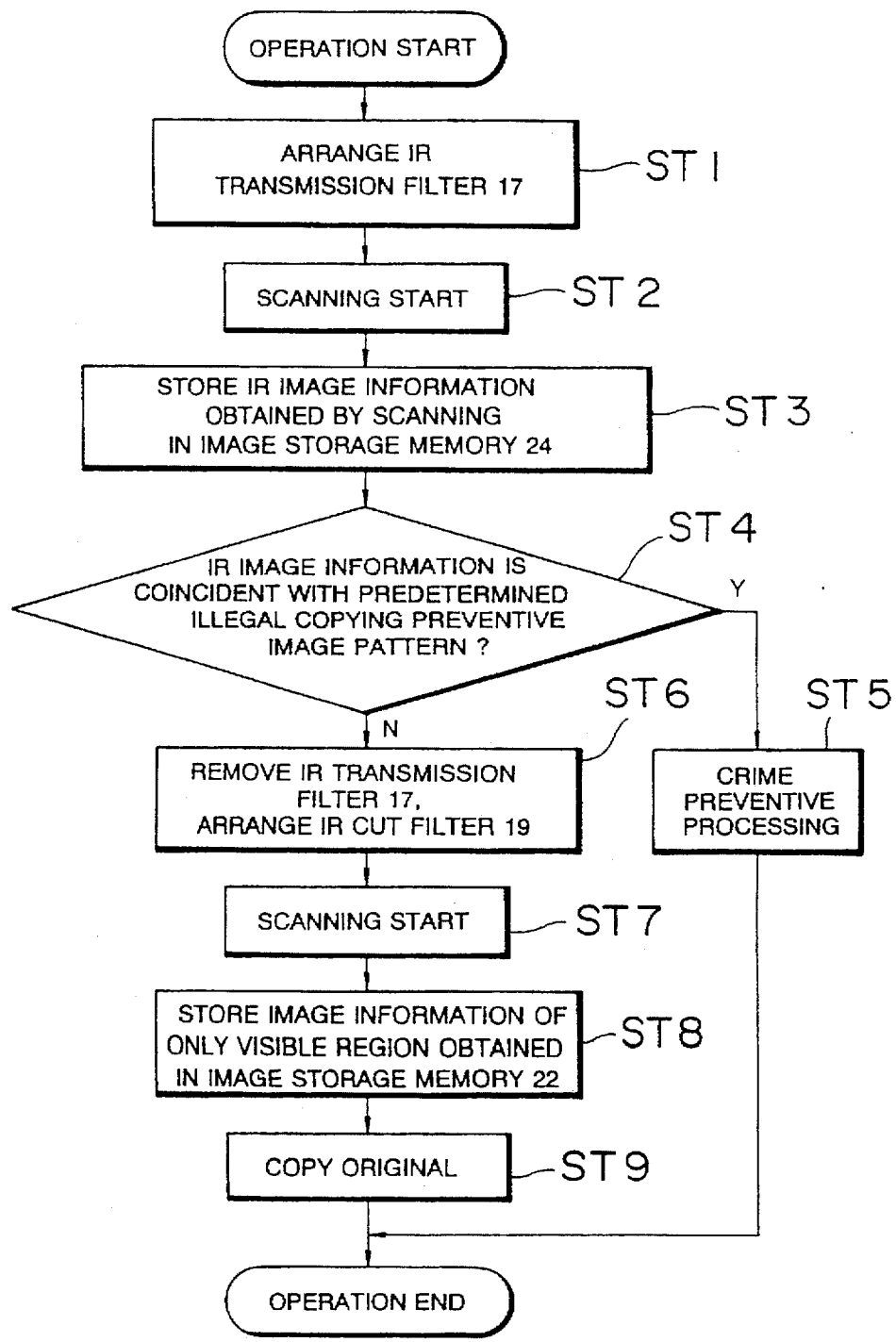

INFORMATION CARRYING SHEET AND ILLEGAL COPYING PREVENTIVE IMAGE PATTERN

This is a divisional of application Ser. No. 08/154,505 filed Nov. 19, 1993, now U.S. Pat. No. 5,475,468.

BACKGROUND OF THE INVENTION

1. Field of the Invention

The present invention relates to a method and a copying machine for preventing illegal copying which are utilized to prevent illegal copying having been prohibited or being required to make impossible, for example, the illegal copying of banknotes, securities and the like, and particularly to a method and a copying machine for preventing illegal copying by which illegal copying is prevented with a less memory capacity by allowing only an illegal copying preventive pattern to be stored. The present invention also relates to an information carrying sheet of securities, identification cards and the like including an illegal copying preventive pattern which is readable by said copying machine or IR readers and hardly visible with the naked eye. The present invention further relates to an illegal copying preventive pattern comprising a plurality of patterns which have an absorption in different wavelength regions and are used in said sheet. The present invention still further relates to an IR absorption ink composition used for the illegal copying preventive pattern.

2. Background Art

Recently, as copying machines have been enhanced in performance, and particularly, high-performance color copying machines have been widely used, there have been frequent crimes of copying and counterfeiting securities such as banknotes, stock certificates, bonds, checks, bankbooks, lottery tickets, postage stamps and stamps, identification cards and the like such as passports and driver's licenses (hereinafter called banknotes and the like).

In order to prevent such crimes, as a crime prevention with respect to copying machine body, a copying machine has been developed which starts copying a subject to be copied only when previously stored image information of banknotes and the like is checked against the image information of the subject to be copied to reveal that both are not coincident with each other (as described in Nikkei Business issued on Apr. 27, 1992, page 29). The constitution of the copying machine is such that the copying machine is mounted with a ROM in which the image information of major banknotes throughout the world has previously been stored, and that if one attempts to copy a banknote having the same image information as that stored in the ROM, the two image informations to be checked against each other as previously described will be coincident, whereby the copying machine performs a predetermined crime preventive processing.

However, in the above-mentioned copying machine, major banknotes and the like of various countries in the world have to be stored in the memory thereof, thereby causing a problem of requiring an enormous memory capacity. Also, the copying machine, in performing copying operation, is required to retrieve a lot of image information in the memory to judge whether coincidence thereof exists or not, so that the copying machine has had a problem that waiting time has become very long because of the time required for the retrieval and for judging whether copying is acceptable or not.

On the other hand, as means for preventing the counterfeiting/altering with respect to the information carrying sheet becoming a subject to be copied, that is, to banknotes and the like, a method has been employed by which an illegal copying preventive image pattern readable mechanically by an IR reader is provided on a given area of the above-mentioned securities, identification cards and the like by the use of a printing ink containing an IR absorption material such as carbon black and IR absorption leuco dye. That is, the prevention of the former counterfeiting copy has been achieved by providing means capable of mechanically reading the above-mentioned image pattern on the copying machine body, and providing control means for stopping copying operation if the information pattern is read by the copying machine, while the truth or falsehood of the latter altered/falsified document has been judged by reading mechanically the prepared document with an IR reader to determine whether the above-mentioned image pattern exists or not.

However, the above-mentioned IR absorption material has an absorption even in visible region, and thus the existence thereof is liable to be read even by the naked eye, so that the IR absorption material has still been insufficient as means for preventing the above-mentioned crime. Although a heat ray absorption glass and a pigmented IR absorption glass which have recently been studied are applicable as an IR absorption material other than the above-mentioned material, a substantial amount of pigment is required to obtain a sufficient absorption, so that such material has had a disadvantage that such material becomes thicker in film thickness than conventional ink and thus the truth or falsehood of the document is naturally discriminated by the step difference.

Accordingly, in the above-mentioned various illegal copying preventive methods, a problem exists in that, for example, if common image information is recognized by an ill-intentioned third party, falsification is immediately performed to make invalid the information for the prevention of illegal copying. In order to prevent such illegal action, it is required that the application of such illegal copying preventive processing is not noticed by a third party whatever method is employed.

Therefore, an object of the present invention is to provide a method and a copying machine for preventing illegal copying which can promptly judge whether copying is acceptable or not with a less memory capacity to shorten copying processing time, and prevent securely an illegal action in such a manner that the application of an image pattern as an illegal copying preventive processing is not noticed easily by a third party.

Another object of the present invention is to provide an information carrying sheet of securities, identification cards and the like including an illegal copying preventive image pattern in which the existence of the above-mentioned image pattern is hardly discriminated by the naked eye.

Still another object of the present invention is to provide an illegal copying preventive image pattern which prevents an unnecessary exposure by combining a plurality of patterns having an absorption in different regions used in the sheet and incorporating a dummy pattern, and which is difficult to perform falsifying/altering/counterfeiting action.

Yet another object of the present invention is to provide an IR absorption ink composition which is used for the image pattern, hardly visible by the naked eye, and has a high IR absorption.

SUMMARY OF THE INVENTION

The present inventors, considering the above-mentioned problems, studied wholeheartedly the problems, with the result that the present inventor has devised the invention as described below. That is, the invention is directed to an illegal copying preventive method of preventing the copying of a subject to be copied which is required to make impossible, wherein a predetermined illegal copying preventive image pattern having an absorption in the IR region and not or a little in the visible region has been previously printed on a subject to be copied; in copying the subject to be copied, an IR light is irradiated to the subject to be copied to detect the reflected light from said subject to be copied; an IR image information is detected from the reflected light; said detected IR image information is compared with the illegal copying preventive image pattern previously stored; and as a result if both are coincident with or similar to each other, a predetermined illegal copying preventive processing is performed.

On the other hand, in another embodiment of the invention a copying machine which copies a subject to be copied by irradiating a light to said subject to be copied, inputting the reflected light from said subject to be copied by image information input means to detect the image information of the subject to be copied, and performing a predetermined copying processing based on said image information, said copying machine comprising illegal copying preventive image pattern storage means for storing previously a predetermined illegal copying preventive image pattern which has been previously formed on a subject an illegal copying of which must be prevented with at least one IR absorption material absorbing IR and not or a little visible ray; an IR transmission filter for transmitting only the IR region of the reflected light; filter control means for moving/removing the IR transmission filter to/from the forward step of the image information input means; and copying acceptance judgement means for comparing the IR image information inputted by the image information input means with the illegal copying preventive image pattern stored in the illegal copying preventive image pattern storage means, and as a result if both are coincident with or similar to each other, determining the copying to be not acceptable to perform a predetermined illegal copying preventive processing, while if otherwise, determining the copying to be acceptable to perform the copying processing of the subject to be copied.

Also, the invention provides a copying machine which copies a subject to be copied by irradiating a light to the subject to be copied, inputting the reflected light from said subject to be copied by first image information input means to detect the image information of the subject to be copied, and performing a predetermined copying processing based on said image information, said copying machine comprising illegal copying preventive image pattern storage means for storing previously a predetermined illegal copying preventive image pattern which has been previously formed on a subject an illegal copying of which must be prevented with at least one IR absorption material absorbing IR and not or a little visible ray; a light source including an IR light for irradiating the IR light to the subject to be copied when a copying request command is inputted; second image information input means for inputting a reflected IR light from the subject to be copied to detect an IR image information of the subject to be copied; and copying acceptance judgement means for comparing the IR image information inputted by the second image information input means with the illegal copying preventive image pattern stored in the illegal copying preventive image pattern storage means, and as a result if both are coincident with or similar to each other, determining the copying to be not acceptable to perform a predetermined illegal copying preventive processing, while if otherwise, determining the copying to be acceptable to perform the copying processing of the subject to be copied.

Further, the invention provides an information carrying sheet characterized in that said sheet is provided with an illegal copying preventive image pattern comprising at least one IR absorption ink containing an IR absorption material having an absorption in the IR region and not or a little in the visible region on an IR reflective base material.

Also, the invention is directed to an information carrying sheet characterized in that said sheet is provided with an illegal copying preventive image pattern comprising at least one IR reflective ink in which a material reflecting the IR region is contained on a base material in which an IR absorption material having an absorption in the IR region and not or a little in the visible region is dispersed in the internal part of whole base material or a specific region, or in the internal part of a coat coated on whole base material or a specific region.

Further, the invention has been made to solve the above-mentioned problems by providing an illegal copying preventive image pattern characterized in that an image pattern formed of characters or marks, designs and the like is divided into at least two patterns or more, and one divided pattern is constituted of an ink having an absorption in the IR region and not or a little in the visible region, while the other divided pattern is constituted of another ink having an absorption in the IR region and the visible region, and that a dummy pattern is provided with being overlapped with the neighboring area of said image pattern and/or with said image pattern, which pattern is formed of at least one of an ink having an absorption in said IR region and not in said visible region, and an ink having the same absorption in the visible region and not in the IR region.

Also, the invention is directed to an illegal copying preventive image pattern characterized in that said pattern comprises in combination with an image pattern formed of an ink having an absorption in the IR region and not or a little in the visible region, and a dummy pattern formed of another ink having an absorption in the IR region and the visible region.

Further, the invention provides an illegal copying preventive image pattern characterized in that an image pattern formed of characters or marks, designs and the like is constituted of an ink having an absorption in the IR region and not or a little in the visible region, and that said pattern comprises in combination with an Indian ink pattern having an absorption in the IR region and the visible region and overlapped with the neighboring area of said image pattern and/or with said image pattern, and a dummy pattern formed of an ink having an absorption in the visible region and not in the IR region.

Also, the invention provides an IR absorption ink composition characterized in that said composition has an absorption in the IR region and not in the visible region, that the content of an ultraviolet curing resin comprising at least prepolymer, monomer, photopolymerization initiator, co-agent and the like is 70.0 through 90.0% by weight, and that the content of a compound having an absorption in the IR region and not or a little in the visible region is 10.0 through 30.0% by weight.

BRIEF DESCRIPTION OF THE DRAWINGS

FIG. 2 is a diagram indicating each pattern represented by breaking another illegal copying preventive image pattern of the present invention.

FIG. 4 is a flowchart to help explain the operation in the embodiment.

DETAILED DESCRIPTION OF THE PREFERRED EMBODIMENTS

Figure 1:
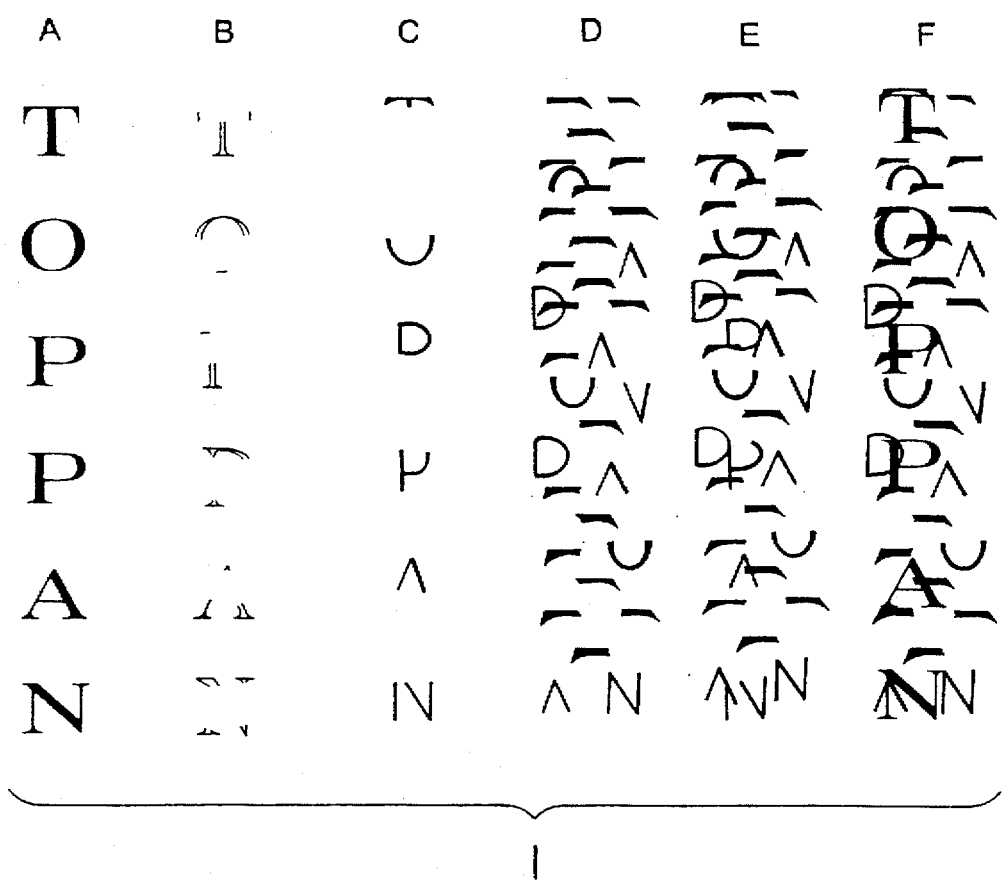
FIG. 1 is a diagram indicating each pattern represented by breaking an illegal copying preventive image pattern of the present invention.

The detail of the present invention will be explained hereinafter.

Although a conventional constitution of copying machines is applicable to the constitution of a copying machine in the present invention, besides the conventional constitution, it is required that the present invention is provided with an image information detector for reading and detecting only the IR region, storage devices, memory storing image patterns, a comparison circuit, a ROM including an illegal copying preventive program, and the like. Any conventional light source having IR region light can be employed as an IR light source, and a system which has a separate IR light source to irradiate to a subject to be copied can be also employed.

In the present invention, as an illegal copying preventive processing, copying is stopped, or the image of a subject to be copied together with predetermined contents different from those of the image of the subject to be copied are copied.

On the other hand, particularly, the above-mentioned illegal copying preventive image pattern is formed of an IR absorption material absorbing the IR region.

Also, the above-mentioned illegal copying preventive image pattern is concealed with a printing ink for reflecting the visible region and transmitting the IR region, as required.

Means for forming an illegal copying preventive image pattern in the present invention is arbitrarily employed, for example, such that where the means is applied to securities such as stock certificates, bonds and checks, print means is given such as gravure printing and offset printing which are a conventional method of producing these securities, while where the means is applied to identification cards and the like such as passports and driver's licenses, the transfer method suitable for the formation of individual information can be applied.

The thickness of the formed pattern is within a range not discriminated visually. The thickness thereof is about 1 through 10 µm, preferably 1 through 3 µm, and where the illegal copying preventive image pattern of the present invention is provided in performing actual offset printing, it becomes 1 through 2 µm. In contrast, where a conventional glass-based IR absorption material is used, it naturally becomes 5 through 10 µm.

As a base material of the illegal copying preventive image pattern of the present invention, anyone used for conventional banknotes and the like such as plain paper, synthetic paper or plastic sheet can be applied.

More specifically, as an IR reflective base material applicable to the present invention, a material capable of reflecting not less than 80% of IR is desirable, and for example, plastic sheet, plain paper, synthetic paper and the like can be used such as paste vinyl chloride into which titanium oxide or the like is incorporated or wiped.

Also, as an IR absorption base material by the present invention, any sheet can be used according to an information carrying sheet to be applied, and for example, plain paper, synthetic paper, plastic sheet and the like are given. As means for dispersing an IR absorption material throughout the entire of a sheet base material or in a specific region, a method such as kneading, incorporating and paper making can be given by way of example according to the kind of material constituting the sheet base material. In place of the method of dispersing in a sheet base material, a method can be employed by which a coating agent in which the above-mentioned IR absorption material has been dispersed is coated throughout the entire of the above-mentioned sheet base material or on a specific region.

In order to reinforce a sheet base material, a reinforcing sheet may be laminated on one side or both sides of a sheet base material.

As subjects to which the information carrying sheet by the present invention is applied, in addition to the above-mentioned various identification cards such as passports and driver's licenses, and securities such as stock certificates, bonds, checks, bankbooks, lottery tickets, railway tickets, coupon tickets and commuter passes, goods related to securities which may be changed to money are given such as plastic cards including ID cards, credit cards, cash cards and gift cards, and as prepaid cards that telephone cards typify.

As an IR reflective ink reflecting the IR region used in the present invention, a white-color type IR reflective ink and the like containing titanium oxide ($TiO_2$) as a major component can be given by way of example.

A particularly preferable IR absorption ink composition in the present invention is an ultraviolet curing type ink composition in which the content of an ultraviolet curing resin component is 70.0 through 90.0% by weight, and the content of the coloring material made of an IR absorption material is 10.0 through 30.0% by weight.

As an IR absorption material which is used for the illegal copying preventive image pattern of the present invention and absorbs the IR region, an IR absorption material is given which is made of a crystalline powder containing either or both of $Cu^{2+}$ and $Fe^{2+}$.

Also, as an IR absorption material used for the illegal copying preventive image pattern of the present invention, the material represented by the following formula 1 is preferably used.

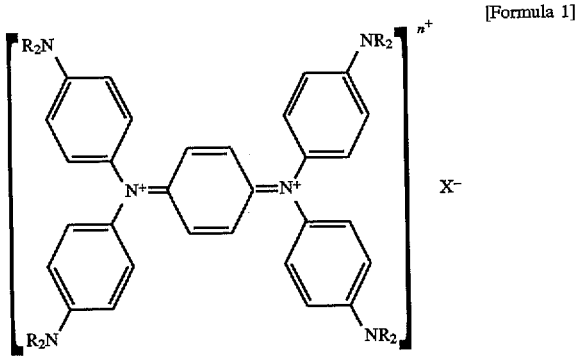

[Formula 1]

In the formula, n represents a natural number of 1 or 2; and R represents a hydrogen atom or an alkyl group having 1~12 carbon atoms, preferably an alkyl group in which the number of carbons is 2 through 5. $X^-$ represents one or a mixture of perchlorate ($ClO_4^-$), fluoride borate ($BF_4^-$), trichloroacetate ($CCl_3COO^-$), trifluoroacetate ($CF_3COO^-$), hexafluoroantimonate ($SbF_6^-$), benzensulfonate ($C_6H_5SO_3^-$), ethanesulfonate ($C_2H_5SO_3^-$) and phosphate ($PO_4^{3-}$). The IR absorption compound assumes a white based color or a light color, so that the compound can be directly applied to a white color or light color based base material, while where the compound is applied to a base material to which a color other than the above-mentioned colors is applied, the hue thereof can be adjusted by the use of the compound together with a coloring pigment or a dye.

An ultraviolet curing resin component used for the IR absorption ink composition of the present invention comprises at least prepolymer, monomer, photopolymerization initiator, co-agent and the like.

Those used as the prepolymer include epoxy acrylate, epoxidized oil acrylate, urethane acrylate, unsaturated polyester, polyester acrylate, polyether acrylate, vinyl/acrylate, polyene/thiol, silicon, polybutadiene, polystyrylethyl methacrylate, and the like.

Those used as the monomer include mono-functional monomer, bi-functional monomer and multi-functional monomer which serve also as a solvent.

Those used as the mono-functional monomer include tert-butylaminoethyl methacrylate, 2-cyanoethyl acrylate, cycrohexyl acrylate, cycrohexyl methacrylate, dicyclopentenyl acrylate, dicyclopenteniloxyethyl acrylate, dicyclopenteniloxyethyl methacrylate, 2 (2-ethoxy ethoxy) ethyl acrylate, 2-ethoxyethyl acrylate, 2-ethylhexyl acrylate, n-hexyl acrylate, 2-hydroxyethyl acrylate, 2-hydroxyethyl methacrylate, hydroxypropyl acrylate, isobornyl acrylate, isobornyl methacrylate, isodecyl acrylate, isodecyl methacrylate, isooctyl acrylate, n-lauryl acrylate, 2-methoxyethyl acrylate, 2-phenoxyethyl acrylate, stearyl methacrylate, tridecyl methacrylate, N-vinyl-pyrrolidone, tetrahydrofurfuryl acrylate, glycidyl methacrylate and the like.

Those used as the bi-functional monomer include neopentyl glycol acrylate, polyethylene glycol 200 diacrylate, bisphenol A ethoxy ethoxy diacrylate, tripropylene glycol diacrylate, tetraethylene glycol diacrylate and the like.

Those used as the multi-functional monomer include pentaerythritol triacrylate, trimethylolpropane triacrylate, propoxy trimethylol, propane triacrylate, dipentaerythritol hexaacrylate and the like.

Those used as the photopolymerization initiator include intramolecular cleavage type ones such as benzoisobutylether, benzyldimethylketal, diethoxyacetophenone, acyloxymester, chlorinated acetophenone, hydroxyacetophenone and acylphosphone oxide, as well as intermolecular hydrogen drawing type ones such as benzophenone, mihilarketone, dibenzosuberone, 2-ethylanthraquinone, isobuthylthioxanthone, benzyl and the like.

In addition, a photopolymerization auxiliary initiator can be added which has a sensitizing effect on amine group, sulfone group and phosphine group such as n-butylamine, di-n-butylamine and tri-n-butylphosphineallylthio uric acid.

In order to improve printing ability, a non-reactive resin or a surface modifier can be added such as wax, vaseline, polyester, epoxy and triazine resin.

As a coloring pigment or a dye capable of being contained in the IR absorption ink or IR reflective ink in the present invention, any material used generally in printing and the like may be applied provided that the material does not depart from the purpose of the present invention. Those used as a pigment include inorganic pigments such as generally known titanium dioxide, zinc sulfide, lead titanate, zirconium oxide, basic lead carbonate, cadmium red and cadmium yellow, as well as organic pigment such as phthalocyanine-based pigment; and those used as a dye include azo dye, quinoline dye, and phthalocyanine-based dye.

The illegal copying preventive image pattern by the present invention can be identified/detected as a positive pattern of white-color ground by a sensor or an IR camera in which the light of the visible region is cut by the irradiation of a laser beam having a wavelength, for example, 750 nm, 780 nm, 810 nm, 830 nm, 905 nm or 940 nm generated by a semiconductor laser.

In one embodiment of the invention according to the constitution as previously described, in a condition that an illegal copying preventive image pattern has been previously printed on a subject to be copied, illegal copying preventive image pattern storage means is provided for storing previously the illegal copying preventive image pattern; in performing copying operation, the light of a region including an IR light is irradiated from a light source of the region including the IR light to the subject to be copied; in image information input means, an IR image information of said subject to be copied is detected from the IR light in the reflected light from the subject to be copied; and in copying acceptance judgement means, the IR image information detected is compared with the illegal copying preventive image pattern previously stored, and if both are coincident with or similar to each other, the copying is determined to be not acceptable to perform a predetermined illegal copying preventive processing, while if otherwise, the copying is determined to be acceptable to perform the copying processing of the subject to be copied.

In another embodiment of the invention, in a condition that an illegal copying preventive image pattern has been previously printed on a subject to be copied, illegal copying preventive image pattern storage means is provided for storing previously the illegal copying preventive image pattern; in performing copying operation, an IR image information is previously taken out by an IR transmission filter to extract the IR region from the reflected light from a subject to be copied (in this case, rescanning is required for actual copying), or the IR image information is taken out by the IR transmission filter from the reflected light branched in performing detecting operation (in this case, one scanning allows also a copying image to be taken out); in image information detection means, the image is detected as the IR image information; in copying acceptance judgement means, the IR image information detected is compared with the illegal copying preventive image pattern previously stored, and if both are coincident with or similar to each other, the copying is determined to be not acceptable to perform a predetermined illegal copying preventive processing, while if otherwise, the copying is determined to be acceptable to perform the copying processing of the subject to be copied; and in filter control means, the IR transmission filter is moved from the above-mentioned image information input means to a predetermined place to start copying.

In this manner, only a predetermined illegal copying preventive image pattern needs to be stored in the illegal copying preventive image pattern storage means, so that whether the copying of a subject to be copied is acceptable or not can be promptly judged with a less memory capacity.

Also, in the above case, if the copying is judged to be not acceptable, the copying processing is stopped or a copying together with predetermined contents is performed, and since the illegal copying preventive image pattern cannot be seen by a person with naked eyes, an illegal action can be prevented securely in such a manner that the application of the illegal copying preventive processing is not noticed easily by a third party.

Also, the illegal copying preventive image pattern is formed of an IR absorption material on a subject to be copied, whereby the IR region of light is remarkably absorbed in said illegal copying preventive image pattern, so that the copying acceptance judgement processing can be correctly performed.

Further, the illegal copying preventive image pattern is concealed with a printing ink, thereby making it difficult to view the illegal copying preventive image pattern, so that the existence of the pattern cannot be noticed easily by a third party.

Also, the IR absorption material of the illegal copying preventive image pattern is produced from a crystal-line powder containing $Cu^{2+}$ and $Fe^{2+}$ or from the compound represented by the above-mentioned formula 1, so that the illegal copying preventive image pattern can be prepared which is excellent in IR absorptivity and hardly visible even without the above-mentioned concealing.

Further, in the present invention a simple and easy constitution using mainly the IR transmission filter and the filter control means, or a simple constitution in which a reflected light is branched in the branch means and thereafter passed through the IR transmission filter allows the same effect as the above-mentioned one to be obtained.

Although concrete embodiments of the present invention will be explained hereinafter with reference to drawings, the present invention is not to be limited thereto.
EMBODIMENTS With reference to drawings, the illegal copying preventive image pattern of the present invention will be specifically explained hereinafter. The present invention, as shown in FIG. 1, is such that an image pattern A formed of characters or marks, designs and the like which are taken as a collation reference indicating true goods is divided, and one divided pattern B is constituted of an ink having an absorption in the IR region and not or a little in the visible region, while the other divided pattern C is constituted of an ink having an absorption in the IR region and the visible region. The present invention is an illegal copying preventive image pattern 1 which is provided further with a dummy pattern D formed of an ink having the same absorption in the visible region as the pattern C and not in the IR region, overlapped with the neighboring area of the image pattern A and/or with the image pattern A. The dummy pattern D may be an ink having an absorption in the IR region and not or a little in the visible region.

A: Illegal copying preventive image pattern formed of characters or marks, designs and the like which are taken as collation reference.

B: One divided pattern of A, being formed of an ink having IR absorptivity (without having visible absorptivity).

C: The other divided pattern of A, being formed of an ink having absorption in full IR and visible regions).

D: Dummy pattern, being formed of an ink having the same visible absorption as C (or IR absorptivity ink similar to B may be employed).

The illegal copying preventive image pattern 1 is provided with the dummy pattern D in addition to the original image pattern A. This causes the illegal copying preventive image pattern 1 to appear to be a pattern E combining C and D in the visible region. With an IR reader such as an IR camera, the pattern 1 appears to be a pattern E combining B, C and D.

Therefore, even if the pattern 1 is copied as it is, only E is copied, so that the pattern A being the collation reference of the illegal copying preventive pattern 1 does not appear. Also, even if the pattern 1 is read by removing an IR cut filter mounted on a conventional CCD camera and the like, only F appears, so that the pattern A being the collation reference of the illegal copying preventive pattern 1 does not appear.

Then, a method of duplicating the pattern A being the collation reference of the illegal copying preventive pattern 1 is such that at first F is read with a reader from which an IR cut filter has been removed. F arranges the divided pattern B having an absorption in the IR region and not in the visible region, the divided pattern C having an absorption in the IR region and the visible region, and the dummy pattern D having an absorption in substantially the same visible region as the divided pattern C in such a manner that they close to or partly overlap with each other, so that a pattern combining B, C, D each having an absorption in respective regions is duplicated with an IR camera (with an IR cut filter). The divided pattern B and the divided pattern C constituting the pattern A being the collation reference have an absorption in the IR region, so that the pattern A can appear by irradiating IR rays obtained through the IR transmission filter thereto and detecting the reflected light.

Only the pattern A does not appear by usual copying, and the irradiation of a specific wavelength light, that is, IR rays allow the pattern A to appear, so that when the pattern is copied as the illegal copying preventive image pattern with the above-mentioned copying machine, and then the copied pattern is collated with the stored image, whether the copying is acceptable or not can be determined. The pattern A has the visible absorption in only the divided pattern C and thus the whole of the divided pattern A cannot be discriminated under visible light, and the dummy pattern D is overlapped therewith, so that a higher camouflage effect can be obtained.

Then, with reference to FIG. 2, the present invention will be explained.

A pattern S indicating characters or marks, and designs being taken as a collation reference is constituted of an ink having an absorption in the IR region and not or a little in the visible region. Further, an illegal copying preventive image pattern 2 comprises in combination with a dummy pattern T formed of an Indian ink having an absorption in the IR region and the visible region and a dummy pattern U formed of an ink having an absorption in the visible region and not in the IR region, in which two dummy patterns are overlapped with the neighboring area of the pattern S and/or with the pattern S.

The illegal copying preventive image pattern 2 is provided with the pattern S not visually discriminated and with the dummy patterns T and U as a camouflage, so that the pattern 2 appears to be V in the visible region. Also, the pattern 2 appears to be W with an IR reader such as an IR camera (using an IR transmission filter). That is, the dummy pattern T is read at the same time, so that the pattern S is not recognized solely.

Thus, in order to take out the pattern S only, with respect to the visible pattern V, an image exhibiting that R image=G image=B image is extracted among outputs read by sensors R, G, B for color separation, and a calculating processing is performed in such a manner that the image is subtracted from the image W. This causes the pattern S to be taken out, and then the pattern is compared with the collation pattern stored, whereby the pattern is recognized as the collation reference S.

EMBODIMENT 1

Before explaining specifically a copying machine and a method of preventing illegal copying according to the present invention, with reference to FIGS. 5 through 7, a general illegal copying preventive image pattern other than mentioned above used for the illegal copying preventive method of the present invention will be explained hereinafter.

Figure 5A:
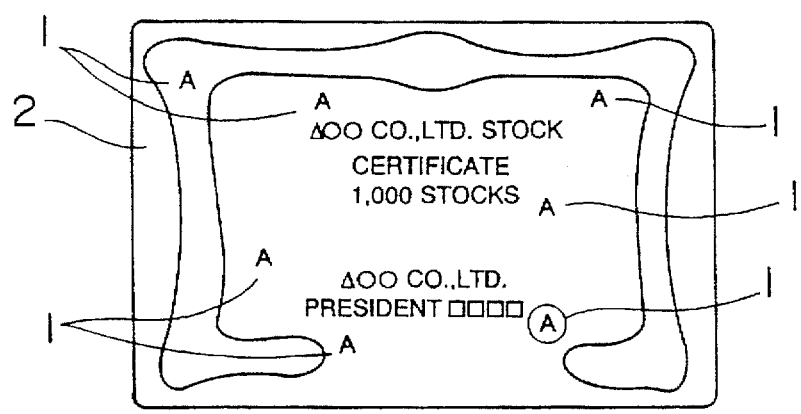
FIG. 5a is a view to help explain an illegal copying preventive image pattern by a reflected light in the full wavelength region in the embodiment.

The illegal copying preventive image pattern 1 has properties of having no absorption or little in the visible region of light and absorbing the IR region, and is printed, for example, on a stock certificate 2 as a subject to be copied whose copying has been prohibited or needs to be impossible, as shown in FIG. 5a.

Figure 5B:
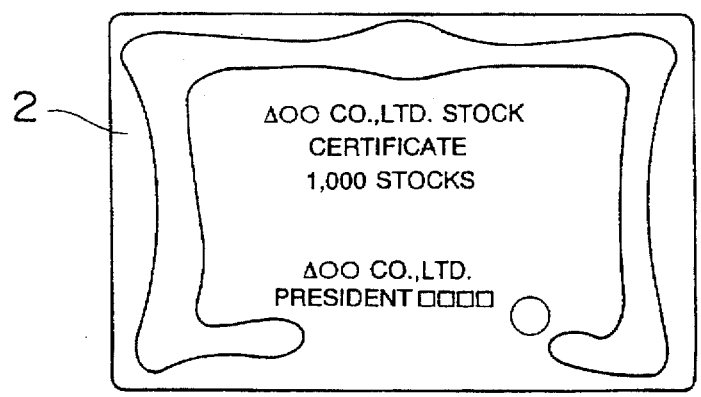
FIG. 5b is a view to help explain an illegal copying preventive image pattern by a reflected light in the visible region in the embodiment.
Figure 5C:
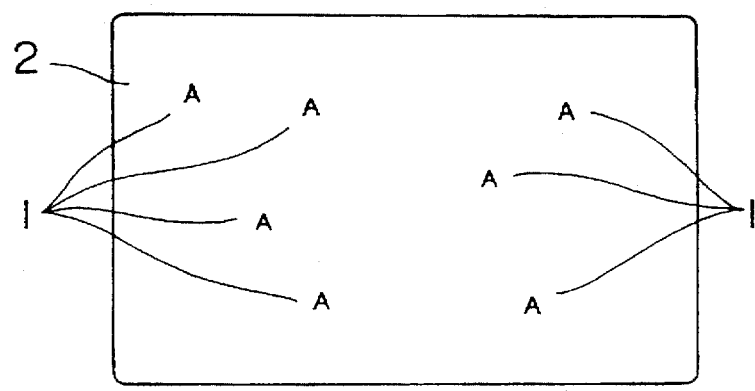
FIG. 5c is a view to help explain an illegal copying preventive image pattern by a reflected light in the IR region in the embodiment.

FIG. 5a is a view obtained when the stock certificate 2 is detected with the full wavelength region including the visible region and IR region of the reflected light. Accordingly, when the stock certificate 2 is viewed with the visible region only, with the IR region cut, the original image information of the stock certificate 2 excluding the illegal copying preventive image pattern 1 is detected as shown in FIG. 5b. Also, when the stock certificate 2 is viewed with the IR region only, with the visible region cut, only the illegal copying preventive image pattern 1 is detected as shown in FIG. 5c.

That is, the illegal copying preventive image pattern 1 can be detected by transmitting the IR region only from the reflected light from the stock certificate 2, and whether the pattern 1 is detected or not is determined, whereby copying stoppage, a predetermined crime preventive processing such as full surface black printing, copying processing and the like can be performed.

Specifically, the illegal copying preventive image pattern 1 is detected with a television camera having a filter for cutting the visible region and transmitting the IR region, for example, an IR scope or a line sensor, and the result of the detection allows a predetermined crime preventive processing and the determination of the truth of the stock certificate 2 to be performed.

The illegal copying preventive image pattern 1 as described above is formed of an IR absorption material on the surface of an IR reflective material, and printed by a printing ink using these materials. In this embodiment, printing inks are used which are produced by preparing the constitution shown below:

(1) IR transmission process ink
  IDOL from Toyo Ink Mfg.: Cyan, magenta, yellow, mixed Indian ink (2) IR reflective ink (white)
  SS16B Medium from Toyo Ink Mfg.: 10 parts by weight
  SSUR 100B from Toyo Ink Mfg.: 2 parts by weight
  Solvent S-787 from Toyo Ink Mfg.: 10 parts by weight
  IR reflective pigment, titanium oxide: 10 parts by weight (3) IR absorption ink (white)
  SS16B Medium from Toyo Ink Mfg.: 10 parts by weight
  SSUR 100B from Toyo Ink Mfg.: 2 parts by weight
  Solvent S-787 from Toyo Ink Mfg.: 10 parts by weight
  IR absorption pigment: 10 parts by weight The IR absorption pigment is a crystalline powder having the following composition:

| | |
|---|---|
| $P_2O_5$ | 50.0% |
| CuO | 49.5% |
| ZnO | 0.5% |

Although this is an example showing the pigment of the IR absorption ink containing $Cu^{2+}$, a composition containing $Fe^{2+}$ as shown below can be used:

| | |
|---|---|
| $P_2O_5$ | 50.0% |
| CuO | 49.5% |
| ZnO | 0.5% |

As an example of a pigment containing both $Fe^{2+}$ and $Cu^{2+}$, a composition as shown below can be used:

| | |
|---|---|
| $P_2O_5$ | 50.0% |
| CuO | 25.0% |
| FeO | 24.5% |
| ZnO | 0.5% |

Then, such powdered pigment is produced by melting a phosphate-based composition having a composition as shown above, crystallizing the melted product to obtain a phosphate-based white crystalline compound, and pulverizing the compound. It is desirable that such phosphate-based white crystalline powder is contained not more than 80% by weight in the printing ink composition excluding the solvent. This is because if the contained amount thereof is exceeded over 80% by weight, a problem will occur that an illegal copying preventive image pattern formed becomes mat-like to cause the reflection of powder surface, that is, the reflection of the IR region to occur, and the cohesive force of the pattern to reach a limit, thereby reducing the adhesion and scratch strength of the pattern.

On the other hand, as an example of an ultraviolet curing type offset IR absorption ink composition containing the compound expressed in the above-mentioned formula, the following compositions are given:

[IR absorption ink composition a]
Oligomer
  (Aliphatic polyester tetraacrylate: Made of Sannobuko Co.; trade name: Photomer-5018): 60 parts by weight
Monomer
  (Trimethylolpropane triacrylate: Made of Nippon Kayaku Co.; trade name: Kayarad TMPTA): 14 parts by weight Polymerization initiator (3, 3-dimethyl-4-methoxybenzophenone: Made of Nippon Kayaku Co.; trade name: Kayacure-MBP): 1 part by weight Polymerization initiator (Thioxanthone: Made of Nippon Soda Co.; trade name: Nissocure-TX): 8 parts by weight Polymerization initiator (4-phenoxydichloroacetophenone: Made of Sandoz Co.; trade name: Sandory-1000): 1 part by weight White vaseline: 4 parts by weight Perchlorate of N,N,N',N'-tetrakis (p-di-n-butylaminophenyl) p-phenylenedialuminium: 12 parts by weight Further, the reflection coefficient of the pattern by the above-mentioned ink a to a 940 nm-semiconductor laser beam has been 19%; the reflection coefficient of white-based coat paper, 80%; and the PCS (Print Contrast Signal) value being image contrast, 0.76.

[IR absorption ink composition b]

Oligomer (Acrylate: Made of Nippon Kayaku Co.; trade name: Epicoat 828): 25 parts by weight Monomer (Trimethylolpropane triacrylate: Made of Nippon Kayaku Co.; trade name: Kayarad TMPTA): 15 parts by weight Monomer (Dipentaerythritol hexaacrylate: Made of Nippon Kayaku Co.; trade name: Kayarad DPHA): 60 parts by weight Polymerization initiator (2,4'-diethylthioxanthone: Made of Nippon Kayaku Co.; trade name:Kayacure-DETX): 3 parts by weight Polymerization initiator (p-dimethylamino benzoic acid isoamyl ester: Made of Nippon Kayaku Co.; trade name: Kayacure-DMBI): 3 parts by weight Fluoride borate of N,N,N',N'-tetrakis (p-di-n-butylaminophenyl) p-phenylenedialuminium: 12 parts by weight Further, the reflection coefficient of the pattern by the above-mentioned ink b to a 940 nm-semiconductor laser beam has been 20%; the reflection coefficient of white-based coat paper, 80%; and the PCS (Print Contrast Signal) value being image contrast, 0.75.

[IR absorption ink composition c]

Oligomer (Aliphatic polyester tetraacrylate: Made of Sannobuko Co.; trade name: Photomer-5018): 60 parts by weight Monomer (Trimethylolpropane triacrylate: Made of Nippon Kayaku Co.; trade name: Kayarad TMPTA): 14 parts by weight Polymerization initiator (3, 3-dimethyl-4-methoxybenzophenone: Made of Nippon Kayaku Co.; trade name: Kayacure-MBP): 1 part by weight Polymerization initiator (Thioxanthone: Made of Nippon Soda Co.; trade name: Nissocure-TX): 8 parts by weight Polymerization initiator (4-phenoxydichloroacetophenone: Made of Sandoz Co.; trade name:Sandory-1000): 1 part by weight White vaseline: 4 parts by weight Fluoride borate of N,N,N',N'-tetrakis (p-di-n-butylaminophenyl) p-phenylenedialuminium: 12 parts by weight Further, the reflection coefficient of the pattern by the above-mentioned ink c to a 940 nm-semiconductor laser beam has been 19%; the reflection coefficient of white-based coat paper, 80%; and the PCS (Print Contrast Signal) value being image contrast, 0.76.

The IR absorption ink is an ink to which any coloring pigment or dye can be applied according to the color condition of the stock certificate 2 as a printing base. In this case, it is desirable that the coloring pigment or dye applied has an IR absorptivity.

Figure 6:
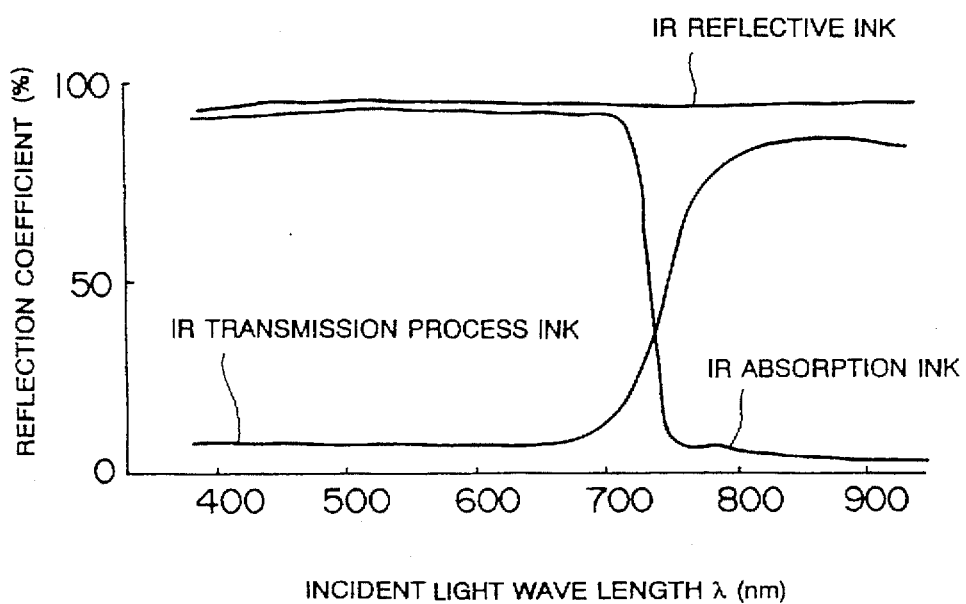
FIG. 6 is a view showing the spectral reflectance properties of a printing ink in the embodiment.

These IR transmission process ink, IR reflective ink and IR absorption ink each have spectral reflection properties as shown in FIG. 6.

Figure 7A:
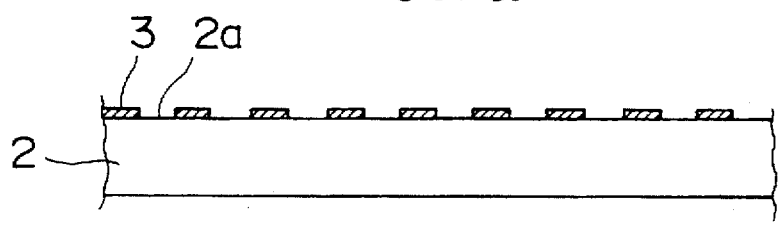
FIG. 7a is a view to help explain the printing of an illegal copying preventive image pattern in the embodiment.

When the illegal copying preventive image pattern 1 is formed by an IR absorption ink as shown in FIG. 7a, the ink having such properties constitutes a printing layer 3 on the stock certificate 2 in such a manner that the contrast to the IR absorption ink is enhanced by an IR reflective ink on the surface 2a of the stock certificate 2. Since it is desirable that the stock certificate 2 has properties of reflecting at least 80% of IR, paste vinyl chloride, paper and the like in which, for example, titanium oxide or the like is incorporated are used.

Figure 7B:
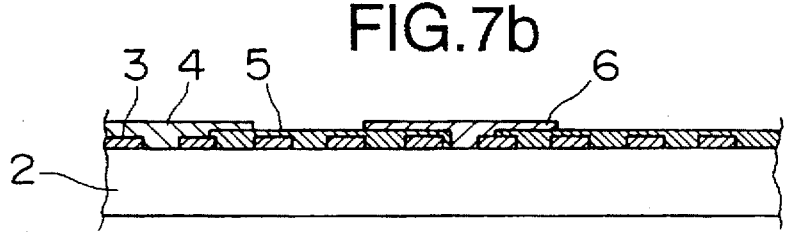
FIG. 7b is a view to help explain the printing of an illegal copying preventive image pattern in the embodiment.

Such printing ink may constitute printing layers 4, 5, 6 corresponding to cyan, magenta, yellow in such a manner that the illegal copying preventive image pattern 1 formed as shown in FIG. 7a is concealed with the IR transmission process ink reflecting the visible region and transmitting the IR region as shown in FIG. 7b.

It will be apparent that although the above-mentioned example is the image pattern formed by the IR absorption ink on the base material having an IR reflecting properties, on the contrary, an image pattern may be accepted which is formed by an IR reflective ink (having no or a little absorption in the visible region) on a base material containing an IR absorption material so as to have an absorptivity.

A copying machine to which an illegal copying preventive method utilizing such illegal copying preventive image pattern is applied will be explained hereinafter.

Figure 8A:
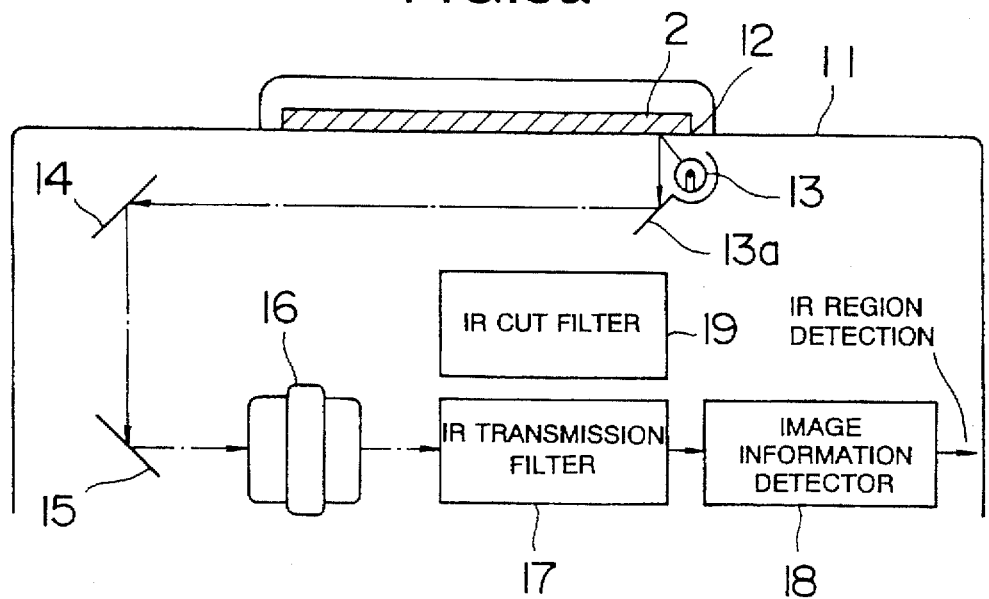
FIG. 8a is a typical view showing an example of the constitution of a copying machine in the embodiment.
Figure 8B:
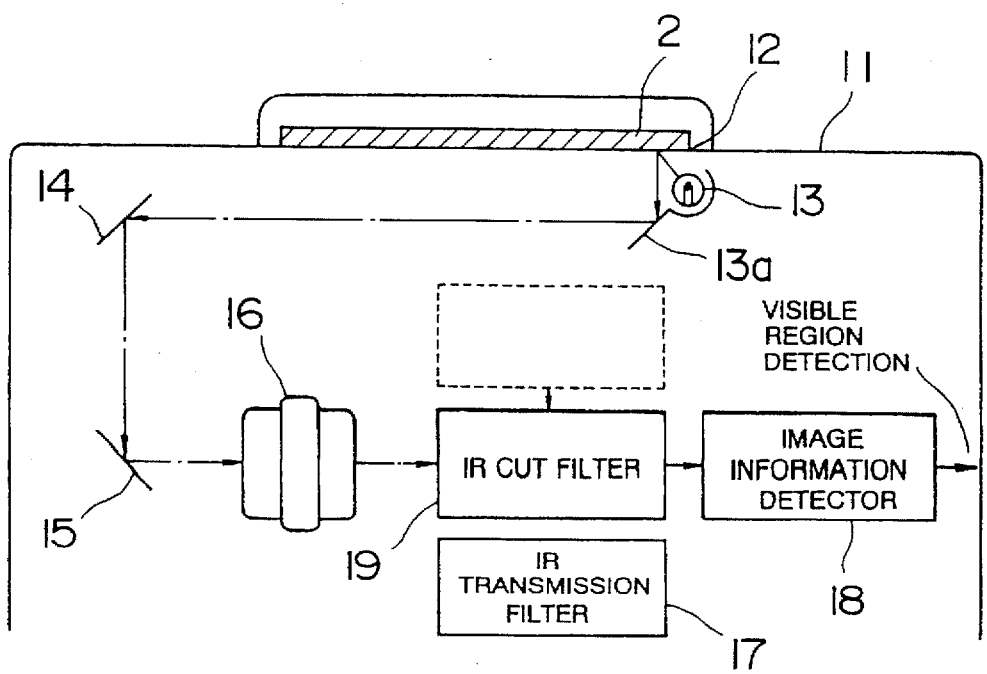
FIG. 8b is a typical view showing an example of the constitution of a copying machine in which a filter has been moved in the embodiment.

FIGS. 8a and 8b are typical views showing the constitution of a copying machine in connection with the embodiment 1 of the present invention. In FIGS. 8a and 8b, the copying machine is such that a transparent bedplate 12 is provided on a copying machine body 11, on which the stock certificate 2 is placed in a manner to face the bedplate 12. A light source 13 is located under the bedplate 12, and reciprocally driven in the horizontal direction when scanning. The light irradiated sequentially from the light source 13 during scanning enters into the bedplate 12 as shown in FIG. 8a to turn to a reflected light corresponding to the image of the stock certificate 2, and then the reflected light enters through mirrors 13a, 14, 15 and a lens 16 into an IR transmission filter 17, by which the visible region is cut, whereby only the illegal copying preventive image pattern 1 is allowed to enter into an image information detector 18.

On the other hand, where the IR transmission filter 17 is removed from the forward step of the image information detector 18 to a predetermined place, an IR cut filter 19 is arranged on the forward step of the image information detector, so that only the visible region of the reflected light from the stock certificate 2 enters through the mirrors 13a, 14, 15 and the lens 16 into the image information detector 18.

Figure 9:
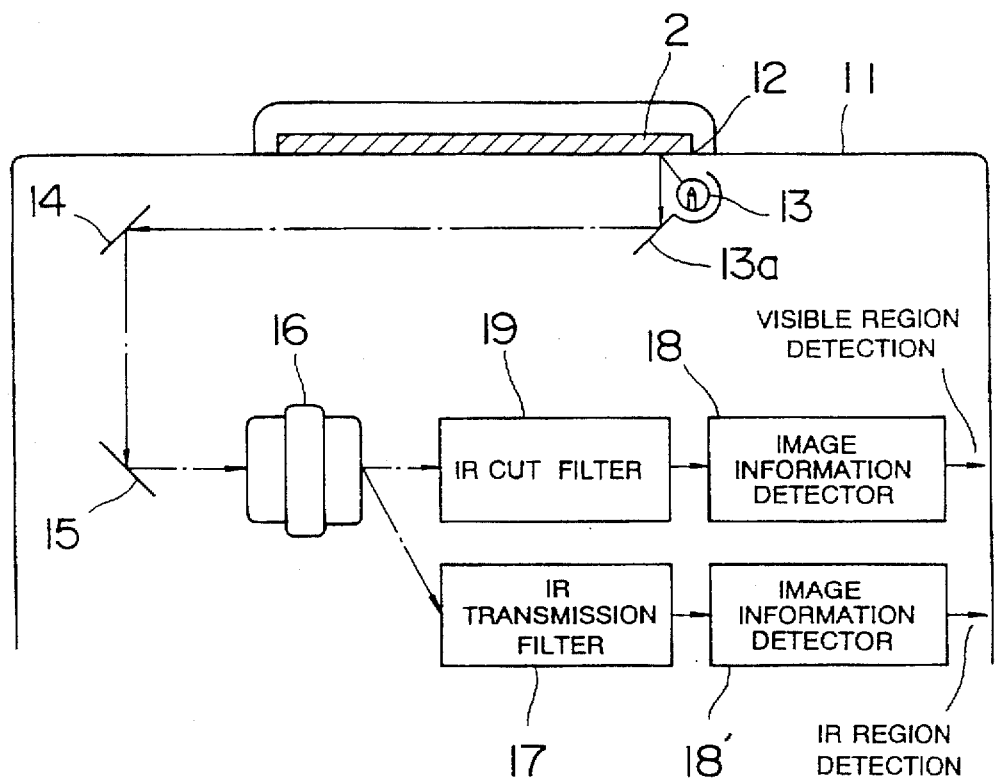
FIG. 9 is a typical view showing an example of the constitution of a copying machine in connection with a second embodiment of the present invention.

In this manner, the constitution of the copying machine is such that the machine drives the IR transmission filter 17 and the IR cut filter 19 to select and detect either of the illegal copying preventive image pattern 1 reflected from the stock certificate 2 or the visible region pattern. The IR transmission filter 17, for example, being the IR −76 (made of HOYA Corporation), has spectral transmission properties as shown in FIG. 9.

Figure 3:
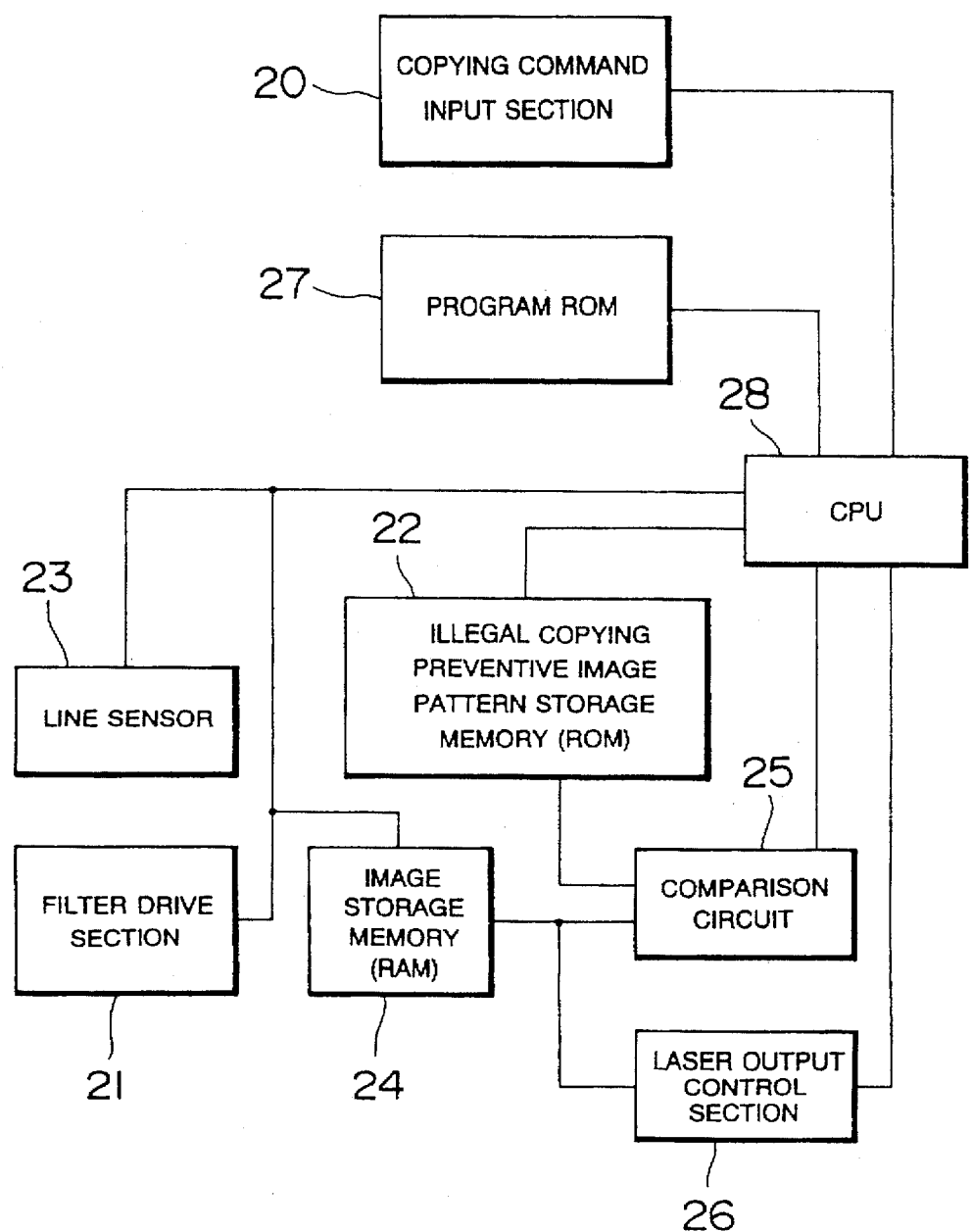
FIG. 3 is a block diagram showing an example of the principal part constitution of a copying machine in connection with an embodiment 1 of the present invention.

FIG. 3 is a block diagram showing an example of the concrete hardware of principal parts of a copying machine according to the present invention. In FIG. 3, the copying machine is constituted in such a manner that a CPU 28 is connected with each a copying command input section 20 for inputting a copying request command from an external source; filter drive section 21 for drivingly controlling the IR transmission filter 17 and the IR cut filter 19; an illegal copying preventive image pattern storage memory 22 for storing previously a predetermined illegal copying preventive image pattern 1; a line sensor 23 which is used as an image information input unit and formed by mounting three-color filters of RGB on a CCD sensor; an image storage memory 24 for storing temporarily an image produced by the reflected light from a subject to be copied that the line sensor 23 detects; a comparison circuit 25 for comparing the illegal copying preventive image pattern 1 stored in the illegal copying preventive image pattern storage memory 22 with the image which is produced by the reflected light and stored in the image storage memory 24; a laser output control section 26; and a program ROM 27 for storing a CPU control program which executes an action shown in the flowchart of FIG. 4 when a copying request command is inputted from the copying command input section 20.

In this embodiment, copying acceptance judgement means is constituted by the comparison circuit 25 and one function of the CPU 28.

With reference to the flowchart of FIG. 4, a method of preventing an illegal copying in the copying machine constituted as described above will be explained hereinafter.

At first the stock certificate 2 on which the illegal copying preventive image pattern 1 has been printed is prepared and placed in the downward direction on the bedplate 12 of the copying machine. A copying request command is inputted from the copying command input section 20 to the CPU 28. Then, in the CPU 28, the CPU control program is read from the program ROM 27 according to the copying request command, and thereafter, an illegal copying preventive processing is executed according to the CPU control program.

At first, in the CPU 28, a transmission filter arrangement command is sent to the filter drive section 21. The IR transmission filter 17 is arranged on the forward step of the line sensor 23 by the filter drive section 21 which has received the transmission filter arrangement command (ST1). When the IR transmission filter 17 has been arranged, the light source 13 goes on and is driven in the horizontal direction by a light source control section (not shown), whereby the scanning of the stock certificate 2 placed on the bedplate 12 is started (ST2).

The reflected light from the stock certificate 2 enters through the mirrors 13a, 14, 15 and the lens 16 into the IR transmission filter 17, and only the IR region transmitting the IR transmission filter 17 enters into the line sensor 23.

In the line sensor 23, the reflected light of only the entering IR region is detected as an IR image information, and the IR image information is stored in the image storage memory 24 by the control of the CPU 28 (ST3).

Subsequently, in the CPU 28, the illegal copying preventive image pattern 1 having been stored in the illegal copying preventive image pattern storage memory 22 and said IR image information having been stored in the image storage memory 24 are sent to the comparison circuit 25.

In the comparison circuit 25, the illegal copying preventive image pattern 1 having been sent from the CPU 28 is compared with said IR image information, and whether both are coincident or not is determined (ST4). As the result of the determination in the ST4, if both are coincident, copying stoppage as a predetermined crime preventive processing is performed (ST5), while when both are not coincident, copying processing described later is started (ST6).

In this embodiment, the illegal copying preventive image pattern 1 has been printed on the stock certificate 2, so that the image information is determined to be coincident in the ST4, and thus the copying stoppage of the copying machine is performed to prevent an illegal copying (ST5). As the crime preventive processing, the copying of predetermined contents together with the image of the subject to be copied such as full surface black printing may be acceptable.

On the other hand, a case where an original is placed on which the illegal copying preventive image pattern 1 has not been printed will be explained. At first, the operation of the copying machine is performed in the steps ST1 through ST4 as described above.

At this point, in the CPU 28, when the image information is determined to be not coincident in the ST4, a cut filter arrangement command is sent to the filter drive section 21. The IR transmission filter 17 is removed from the forward step to a predetermined place by the filter drive section 21 having received the cut filter arrangement command, while the IR cut filter 19 is arranged on the forward step of the line sensor 23 by the filter drive section 21 having received the cut filter arrangement command (ST6).

In this status, in the CPU 28, a scanning start command is sent to the light source control section. The light source 13 is allowed to go on by the light source control section having received the scanning start command, and at the same time, driven in the horizontal direction, whereby the original placed on the bedplate 12 is scanned (ST7).

The reflected light from the original enters through the mirrors 13a, 14, 15 and the lens 16 into the IR cut filter 19, and only the visible region transmitting the IR cut filter 19 enters into the line sensor 23.

In the line sensor 23, the reflected light of only the entering visible region is detected as an image information, and in the CPU 28, the image information is stored in the image storage memory 22 (ST8).

Subsequently, in the CPU 28, a laser output control command is sent according to the image information having been stored in the image storage memory 22. In the laser output control section 26, the output of a laser (not shown) and the rotation of a polygon mirror are controlled according to the laser output control command sent from the CPU, and the copying of the original is started by the exposure and the like of a sensitized drum (ST9).

When the original has been copied and then another original is placed, in a similar manner for the other original, the copying acceptance is determined according to the procedure from the ST1, and based on the determined result, the illegal copying preventive processing or copying processing is performed.

As described above, in the embodiment 1, the illegal copying preventive image pattern storage memory 22 is provided for storing previously the predetermined illegal copying preventive image pattern 1; in performing copying operation, the CPU 28 sends the transmission filter arrangement command to the filter drive section 21; when the filter drive section 21 arranges the IR transmission filter 17 to the front of the line sensor 23, the light source 13 goes on to scan the subject to be copied, thereby entering the reflected light from the subject to be copied into the IR transmission filter 17; the IR transmission filter 17 transmits only the IR region from the reflected light to enter the region into the line sensor 23, whereby the line sensor 23 detects the IR image information; the CPU 28 sends the IR image information and the illegal copying preventive image pattern 1 to the comparison circuit 25; the comparison circuit 25 compares the IR image information with the illegal copying preventive image pattern 1 to determine whether both are coincident or not; and the CPU 28 responds to the determined result of the comparison circuit 25 to perform the predetermined crime preventive processing or copying processing.

Accordingly, the illegal copying preventive image pattern storage memory 22 needs to store only the predetermined illegal copying preventive image pattern 1, so that unlike prior art in which the image information of major banknotes in the world has been stored, compared and determined, the memory capacity can be remarkably reduced and the judgement time required for copying such as retrieval time and caparison/judgement time be shortened, thereby achieving a significantly reduced copying time.

In the embodiment 1, the copying acceptance judgement is based on the illegal copying preventive image pattern 1 which is not visible by a person, so that the application of the illegal copying preventive processing of printing the illegal copying preventive image pattern 1 is not noticed by a third party, and thus an illegal action can be securely prevented.

Further, in the embodiment 1, the illegal copying preventive pattern 1 is formed with an IR absorption material, and an IR reflective material is printed on the external side of the illegal copying preventive pattern 1, thereby enhancing the contrast of the IR image information, so that the copying acceptance judgement can be correctly performed.

On the other hand, in the embodiment 1, the IR absorption material of the illegal copying preventive image pattern 1 is produced from a crystalline powder containing $Cu^{2+}$ and $Fe^{2+}$ or from a compound represented by the formula 1, so that the illegal copying preventive image pattern 1 can be produced which is good in IR absorptivity and hardly visible.

Also, in the embodiment 1, the illegal copying preventive image pattern 1 containing $Cu^{2+}$ and $Fe^{2+}$ or a compound of the formula 1 is concealed with an IR transmission process ink, thereby making it more difficult to view the illegal copying preventive image pattern 1, so that the existence of the pattern 1 cannot be noticed easily by a third party.

The constitution of the embodiment 1 is such that the embodiment 1 uses mainly the IR transmission filter 17 and the filter drive section 21, so that the embodiment 1 can be realized simply and cheaply.

EMBODIMENT 2

Figure 10:
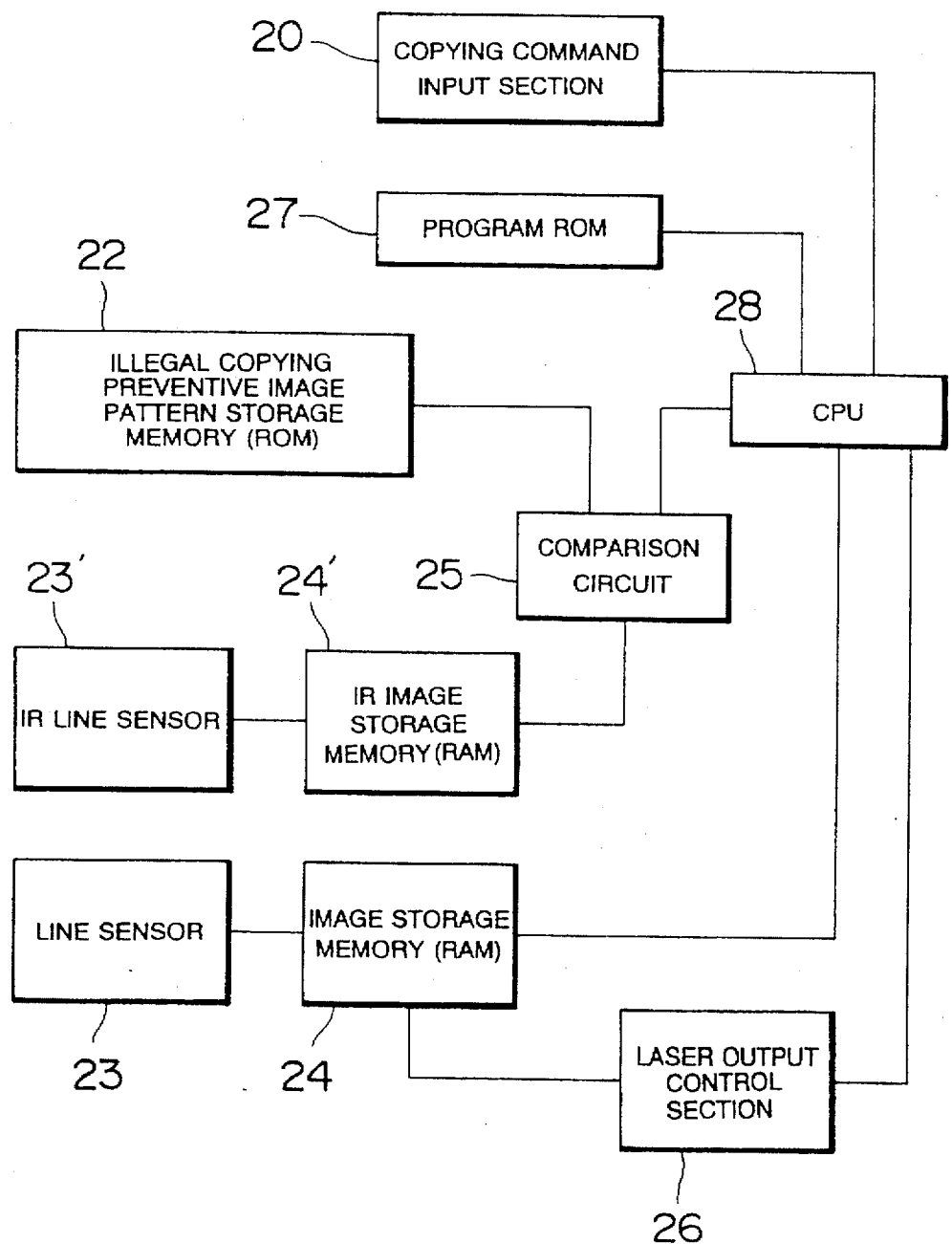
FIG. 10 is a block diagram showing an example of the principal part constitution of a copying machine in the embodiment.
Figure 11:
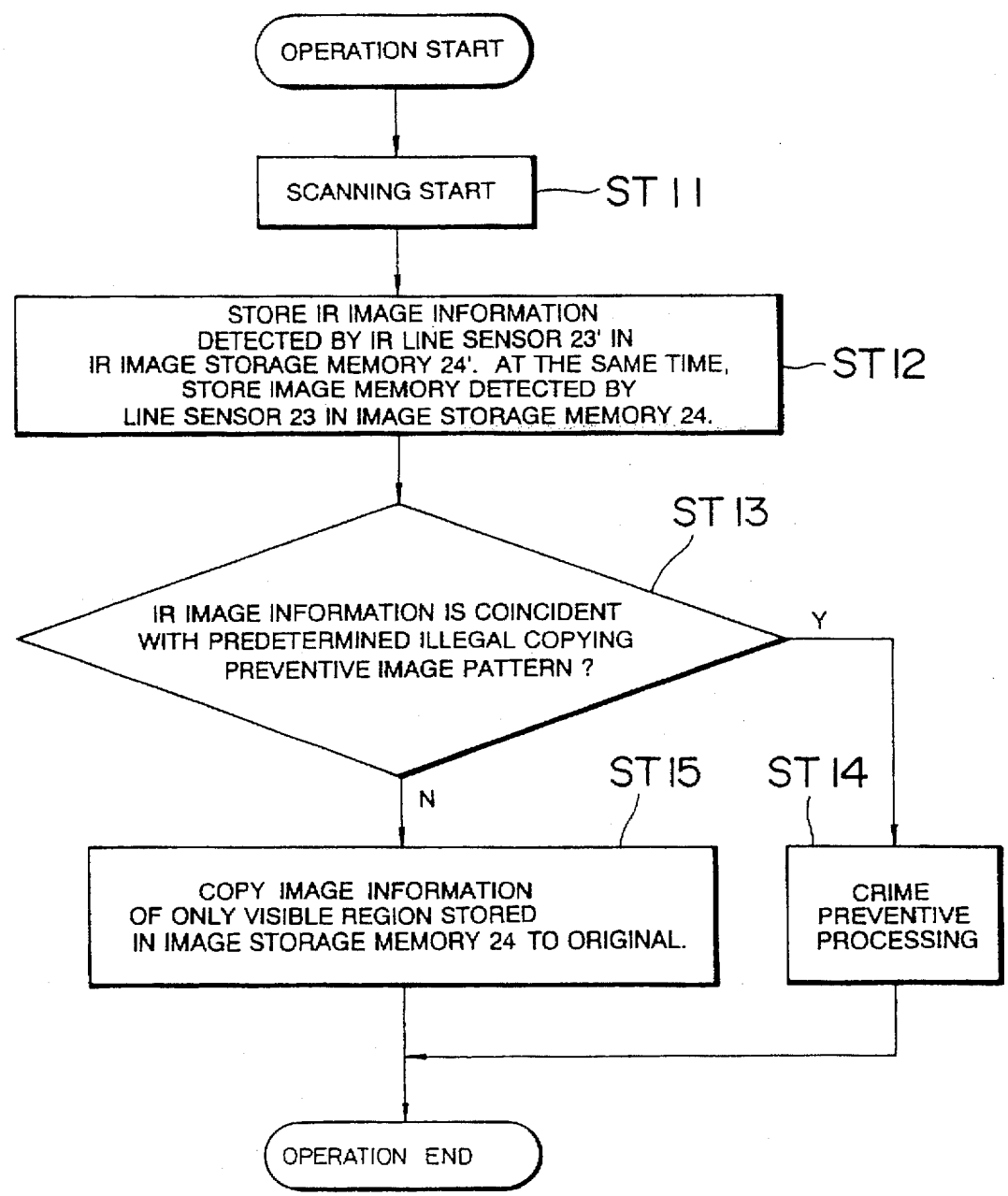
FIG. 11 is a flowchart to help explain the operation in the embodiment.

With reference to FIGS. 9 through 11, a second embodiment of the present invention will be explained hereinafter.

The constitution of the copying machine is such that as shown in FIG. 9, a second image information detector 18' is added to the backward step of the IR transmission filter 17 in addition to the constituting parts shown in FIG. 8b; and at the same time when the visible region of the reflected light is detected by the first image information detector 18, the IR region is detected by the second image information detector 18'.

Specifically, the copying machine, as shown in FIG. 10, is constituted in such a manner that an IR line sensor 23' as the second image information detector, and an IR image storage memory 24' are added to, and the filter drive section 21 is omitted from the principal parts shown in FIG. 3.

With reference to the flowchart of FIG. 11, a method of preventing an illegal copying in the copying machine will be explained hereinafter.

At first, an original is placed on the bedplate 12, and a copying request command is inputted to the CPU 28 in the copying command input section. According to the copying request command, the scanning of the original is started by the light source control section (ST11).

Now, the reflected light from the original is detected as the IR image information of only the IR region by the IR line sensor 23' and stored in the IR image storage memory 24', and at the same time, detected as the image information of only the visible region by the line sensor 23 and stored in the IR image storage memory 24 (ST12).

Subsequently, in the CPU 28, the illegal copying preventive image pattern 1 having been previously stored in the illegal copying preventive image pattern storage memory 22 and said IR image information having been previously stored in the IR image storage memory 24' are sent to the comparison circuit 25.

In the comparison circuit 25, the illegal copying preventive image pattern 1 sent from the CPU 28 is compared with said IR image information to determine whether both are coincident or not (ST13). As the result of the determination in the ST13, if both are coincident, crime preventive processing is performed (ST14), while when both are not coincident, copying processing is performed (ST15). Now, the copying processing in a case where the result of the comparison has been determined to be not coincident will be explained.

In the ST13, in the comparison circuit 25, a copying acceptance command is sent to the CPU 28 by the above-mentioned determination of non-coincidence. The CPU 28, upon receiving the copying acceptance command, reads an image information of only the visible region stored in the image information memory 24 in the ST12, and sends a laser output control command according to said image information. In the laser output control section 26, the copying of the original is started according to the laser output control command (ST15).

When the original has been copied and then another original is placed, in a similar manner to that described above, the copying acceptance is determined for each original according to the procedure from the ST11, and based on the determined result, the illegal copying preventive processing or copying processing is performed.

As described above, in the embodiment 2, the IR line sensor 23' is additionally provided; in performing copying operation, the light source 13 goes on to scan the subject to be copied only once; the reflected light from the subject to be copied at this point is allowed to enter into the line sensor 23 and the IR line sensor 23', whereby the IR line sensor 23' detects IR image information, and at the same time, the line sensor 23 detects image information of the visible region; the CPU 28 sends the IR image information and the illegal copying preventive image pattern 1 to the comparison circuit 25; the comparison circuit 25 compares the IR image information with the illegal copying preventive image pattern 1 to determine whether both are coincident or not; and the CPU 28 responds to the determined result of the comparison circuit 25 to perform the predetermined crime preventive processing or perform copying start processing according to the image information from the above-mentioned line sensor 23.

Accordingly, in the embodiment 2, the image information of the IR region and that of the visible region are simultaneously detected by performing scanning operation only once, and the copying acceptance is determined, thereby making it possible to perform copying processing, so that compared with the embodiment 1, while shortening the scanning time of the visible region by one scanning for each content of the original, the same effect as the above-mentioned embodiment 1 can be obtained.

Although, in the embodiment 1, there has been described a case where a light including the visible region and the IR region is irradiated to the original, and only the IR region from the reflected light is allowed to transmit the IR transmission filter 17 so as to detect the IR image information, without being limited thereto, even where a constitution is such that using an IR source, IR light is allowed to enter directly into the original so as to detect the IR image information from the IR reflected light, the same effect can be obtained by performing the present invention in similar manner.

Although, in the embodiment 1, there has been described a case where the IR transmission filter 17 and the IR cut filter 19 are allowed to move at the forward step of the image information detection means to select only the IR region or only the visible region from the reflected light, thereby detecting the IR image information or the image information, without being limited thereto, even where a constitution is such that the IR transmission filter 17 and the IR cut filter 19 are allowed to move at the backward step of the light source 13, and from the beginning the light of only the IR region or only the visible region is allowed to enter into the original so as to detect the IR image information or the image information from the reflected light of only the IR region or only the visible region, respectively, the same effect can be obtained by performing the present invention in a similar manner.

On the other hand, although, in this embodiment, there has been described a case where those made by Toyo Ink Mfg. as an IR absorption ink are used other than pigments, without being limited thereto, even where a constitution is such that the material described in Japanese Patent Application No. 4-258256 is used, it has been confirmed that the same effect can be obtained by performing the present invention in a similar manner. The constitution of an IR absorption ink using the material is shown below:

Pigment (Phosphate-based white crystalline compound): 30 parts by weight

Acetate vinyl-based resin (made of Sekisui Chemical Co.; trade name: Elex A): 10 parts by weight Saturated polyester (made of Toyobo Co.; trade name: Byron 103): 5 parts by weight Polyurethane elastomer (made of Nippon Polyurethane Co.; trade name: N-2304): 12 parts by weight Isocyanate curing agent: 3 parts by weight Triethylenediamine: 0.5 part by weight Solvent (Toluene/methyl isobutyl ketone): 60 parts by weight Although, in these embodiments, there has been described a case where the stock certificate 2 is used as a prohibited subject to be copied, without being limited thereto, even where a constitution is such that banknotes, securities, checks, merchandise coupons, gold notes, identification cards, lottery tickets, betting tickets, coupon tickets, commuter passes and the like are used as a prohibited subject to be copied, the same effect can be obtained by performing the present invention in a similar manner.

Further, although, in this embodiment, there has been described a case where the illegal copying preventive image pattern 1 is formed as expressed as "A", without being limited thereto, even where the illegal copying preventive image pattern 1 is printed with any image, the same effect can be obtained by performing the present invention in a similar manner. It will be apparent that if an illegal copying preventive image pattern including the dummy pattern described above is used, counterfeit/alteration preventive effect is enhanced.

Still further, although, in this embodiment, there has been described a case where one kind of the illegal copying preventive image pattern 1 is used, even where a constitution is such that any plurality of kinds of the illegal copying preventive image pattern are previously registered and respective kind of the patten is compared/determined, the same effect can be obtained by performing the present invention in a similar manner.

Additionally, the present invention can be performed by being modified variously without departing from its purpose.

ADVANTAGES OF THE INVENTION

As described previously, according to the present invention, in a condition that an illegal copying preventive image pattern has been previously printed on a subject to be copied, illegal copying preventive image pattern storage means is provided for storing previously the illegal copying preventive image pattern; in performing copying operation, an IR light is irradiated from a light source of the region including at least the IR light to the subject to be copied; image information input means detects an IR image information of said subject to be copied from the reflected IR light received from the subject to be copied; or in performing copying operation, filter control means moves an IR transmission filter to the forward step of the image information input means, and the IR transmission filter transmits only the IR region from the reflected light from the subject to be copied so as to send the region to image information detection means; the image information detection means detects an IR image information from the light of the IR region; and copying acceptance judgement means compares said IR image information with the illegal copying preventive image pattern previously stored, and if both are coincident with or similar to each other, the copying is determined to be not acceptable to perform a predetermined illegal copying preventive processing, while if otherwise, the copying is determined to be acceptable to perform the copying processing of the subject to be copied; whereby the copying acceptance of the subject to be copied can be promptly determined with a less memory capacity corresponding to the predetermined illegal copying preventive image pattern, and the illegal copying preventive image pattern is formed on an information carrying sheet in a manner to be not visible and hardly discriminated, so that a method and a copying machine for preventing an illegal copying, an illegal copying preventive pattern, and an information carrying pattern can be provided which can perform securely an illegal copying preventive processing in a manner that the application of the illegal copying preventive processing is not noticed easily by a third party.

What is claimed is:

1. An information carrying sheet characterized in that said sheet is provided with an illegal copying preventive image pattern formed of at least one IR absorption ink containing an IR absorption material having absorption in the IR region and no or little absorption in the visible region on an IR reflective base material.

2. An information carrying sheet as set forth in claim 1, characterized in that said IR absorption material comprises a crystalline powder containing either or both of $Cu^{2+}$ and $Fe^{2+}$.

3. An information carrying sheet as set forth in claim 1, characterized in that said IR absorption material comprises at least one compound represented by the following formula 1:

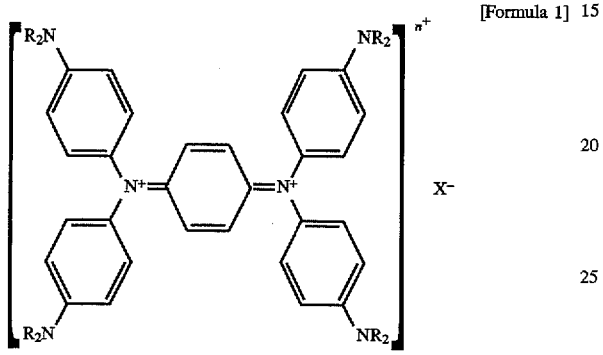

[Formula 1]

Wherein, n represents a natural number of 1 or 2; R represents a hydrogen atom or an alkyl group having 1~12 carbon atoms; and $X^-$ represents one or a mixture of $ClO_4^-$, $BF_4^-$, $CCl_3COO^-$, $CF_3COO^-$, $SbF_6^-$, $C_6H_5SO_3^-$, $C_2H_5SO_3^-$ and $PO_4^{3-}$.

4. An information carrying sheet as set forth in claim 1, characterized in that said sheet includes a coloring pigment or a dye together with said IR absorption ink.

5. An information carrying sheet as set forth in claim 1, characterized in that a contrast is enhanced between the IR absorption ink and the IR reflective base material.

6. An information carrying sheet as set forth in claim 1, characterized in that the illegal copying preventive image pattern is formed to correspond to a pattern stored in a copying machine.

7. An information carrying sheet as set forth in claim 1, characterized in that the illegal copying preventive image pattern is in the form of marks or characters.

8. An information carrying sheet characterized in that said sheet is provided with an illegal copying preventive image pattern comprising at least one white-color IR reflective ink in which a material reflecting the IR region is contained on a base material, wherein an IR absorption material having an absorption in the IR region and no or little absorption in the visible region is dispersed in the internal part of whole base material of a specific region, or in the internal part of a coat coated on whole base material or a specific region.

9. An information carrying sheet as set forth in claim 8, characterized in that said IR absorption material comprises a crystalline powder containing either or both of $Cu^{2+}$ and $Fe^{2+}$.

10. An information carrying sheet as set forth in claim 8, characterized in that said IR absorption material comprises at least one compound represented by the following formula 1:

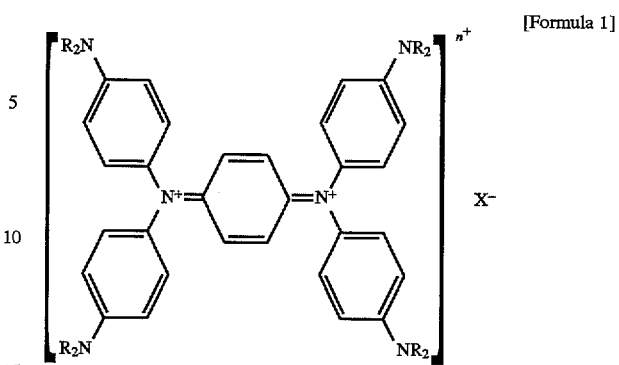

[Formula 1]

Wherein, n represents a natural number of 1 or 2; R represents a hydrogen atom or an alkyl group having 1~12 carbon atoms; and $X^-$ represents one or a mixture of $ClO_4^-$, $BF_4^-$, $CCl_3COO^-$, $CF_3COO^-$, $SbF_6^-$, $C_6H_5SO_3^-$, $C_2H_5SO_3^-$ and $PO_4^{3-}$.

11. An information carrying sheet as set forth in claim 8, characterized in that said sheet includes a coloring pigment or a dye together with said IR absorption ink.

12. An information carrying sheet as set forth in claim 8, characterized in that a contrast is enhanced between the IR reflective ink and the IR absorption material.

13. An information carrying sheet as set forth in claim 8, characterized in that the illegal copying preventive image pattern is formed to correspond to a pattern stored in a copying machine.

14. An information carrying sheet as set forth in claim 8, characterized in that the illegal copying preventive image pattern is in the form of marks or characters.

15. An illegal copying preventive image pattern characterized in that an image pattern formed of characters or marks, designs and the like is divided into at least two patterns or more, and one divided pattern is constituted of an ink having an absorption in the IR region and not or a little in the visible region, while the other divided pattern is constituted of another ink having an absorption in the IR region and the visible region, and that a dummy pattern is provided with being overlapped with the neighboring area of said image pattern and/or with said image pattern, which dummy pattern is formed of at least one of an ink having an absorption in said IR region and said visible region, and an ink having the same absorption in the visible region and not in the IR region.

16. An illegal copying preventive image pattern characterized in that said pattern comprises in combination with an image pattern formed of an ink having an absorption in the IR region and not or a little in the visible region, and a dummy pattern formed of another ink having an absorption in the IR region and the visible region.

17. An illegal copying preventive image pattern characterized in that an image pattern formed of characters or marks, designs and the like is constituted of an ink having an absorption in the IR region and not or a little in the visible region, and that said pattern comprises in combination with an Indian ink pattern having an absorption in the IR region and the visible region and a dummy pattern formed of an ink having an absorption in the visible region and not in the IR region, wherein said Indian ink pattern and the dummy pattern are overlapped with the neighboring area of said image pattern and/or with said image pattern.

18. An IR absorption ink composition characterized in that said composition has an absorption in the IR region and not or a little in the visible region, that the content of an ultraviolet curing resin comprising at least prepolymer, monomer, photopolymerization initiator, co-agent and the like is 70.0 through 90.0% by weight, and that the content of a compound having an absorption in the IR region and no or a little in the visible region is 10.0 through 30.0% by weight.

19. An IR absorption ink composition as set forth in claim 18, characterized in that said IR absorption material comprises a crystalline powder containing either or both of $Cu^{2+}$ and $Fe^{2+}$.

20. An IR absorption ink composition as set forth in claim 18, characterized in that said IR absorption material comprises at least one compound represented by the following formula 1:

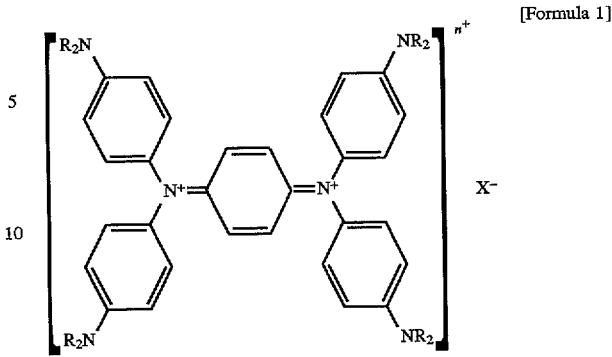

[Formula 1]

Wherein, n represents a natural number of 1 or 2; R represents a hydrogen atom or an alkyl group having 1~12 carbon atoms; and $X^-$ represents one or a mixture of $ClO_4^-$, $BF_4^-$, $CCl_3COO^-$, $CF_3COO^-$, $SbF_6^-$, $C_6H_5SO_3^-$, $C_2H_5SO_3^-$ and $PO_4^{3-}$.

* * * * *